(12) United States Patent
Nystrom et al.

(10) Patent No.: US 9,519,498 B2
(45) Date of Patent: Dec. 13, 2016

(54) VIRTUAL MACHINE ASSURANCES

(71) Applicant: Microsoft Technology Licensing, LLC, Redmond, WA (US)

(72) Inventors: Magnus Nystrom, Sammamish, WA (US); Stefan Thom, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 250 days.

(21) Appl. No.: 14/140,214

(22) Filed: Dec. 24, 2013

(65) Prior Publication Data

US 2015/0178504 A1   Jun. 25, 2015

(51) Int. Cl.
*G06F 9/455* (2006.01)
*G06F 21/53* (2013.01)
*G06F 21/57* (2013.01)
*G06F 9/44* (2006.01)

(52) U.S. Cl.
CPC .......... *G06F 9/45533* (2013.01); *G06F 21/53* (2013.01); *G06F 21/575* (2013.01); *G06F 9/4403* (2013.01); *G06F 2009/45587* (2013.01)

(58) Field of Classification Search
CPC .......... G06F 21/00; G06F 21/10; G06F 21/12; G06F 21/30; G06F 21/44; G06F 21/50; G06F 21/51; G06F 21/53; G06F 21/57–21/575; G06F 9/445; G06F 9/45533; G06F 9/45537; G06F 9/45545; G06F 9/45558; G06F 9/45575; G06F 9/45587
See application file for complete search history.

(56) References Cited

U.S. PATENT DOCUMENTS

| | | |
|---|---|---|
| 7,380,119 B2 | 5/2008 | Bade et al. |
| 7,836,299 B2 | 11/2010 | England et al. |
| 7,860,802 B2 | 12/2010 | Pandya et al. |
| 8,060,876 B2 | 11/2011 | Smith et al. |
| 8,065,713 B1 | 11/2011 | Vainstein et al. |
| 8,074,262 B2 | 12/2011 | Scarlata |
| 8,151,262 B2 | 4/2012 | Challener et al. |

(Continued)

FOREIGN PATENT DOCUMENTS

| | | |
|---|---|---|
| EP | 2577539 | 4/2013 |
| WO | WO 0163831 | 8/2001 |

(Continued)

OTHER PUBLICATIONS

"International Search Report and Written Opinion Issued in PCT Patent Application No. PCT/US2014/071773", Mailed Date: Mar. 23, 2015, 10 Pages.

(Continued)

*Primary Examiner* — Eric W Shepperd
(74) *Attorney, Agent, or Firm* — Timothy Churna; Dan Choi; Micky Minhas

(57) ABSTRACT

Briefly, aspects of the subject matter described herein relate to virtual machines. In aspects, when a host is reset or powered on, a measured boot is performed. If the measured boot indicates that the host is in a state that satisfies a policy for gaining access to a cryptographic key, the cryptographic key may be obtained. The cryptographic key may be used, directly or indirectly, to decrypt data of a virtual storage device. This decrypted data may then be used to instantiate a virtual machine.

16 Claims, 8 Drawing Sheets

(56) References Cited

U.S. PATENT DOCUMENTS

| | | | |
|---|---|---|---|
| 8,208,637 B2 | 6/2012 | Ellison | |
| 8,249,257 B2 | 8/2012 | Brutch et al. | |
| 8,341,427 B2 | 12/2012 | Auradkar et al. | |
| 8,356,347 B2 | 1/2013 | Berger et al. | |
| 8,375,437 B2 | 2/2013 | Linsley et al. | |
| 8,411,863 B2 | 4/2013 | Ureche et al. | |
| 8,909,939 B1* | 12/2014 | Beda, III | G06F 21/606 713/189 |
| 9,172,683 B2 | 10/2015 | Farrugia et al. | |
| 2001/0055396 A1 | 12/2001 | Jevans | |
| 2003/0226031 A1* | 12/2003 | Proudle | G06F 21/57 726/16 |
| 2005/0166051 A1* | 7/2005 | Buer | H04L 9/3263 713/173 |
| 2006/0020781 A1 | 1/2006 | Scarlata et al. | |
| 2006/0126836 A1 | 6/2006 | Rivas | |
| 2006/0155988 A1* | 7/2006 | Hunter | G06F 21/575 713/164 |
| 2006/0256108 A1 | 11/2006 | Scaralata | |
| 2007/0016801 A1 | 1/2007 | Bade et al. | |
| 2007/0094719 A1 | 4/2007 | Scarlata | |
| 2008/0046581 A1 | 2/2008 | Molina et al. | |
| 2008/0209221 A1* | 8/2008 | Vennelakanti | H04L 63/062 713/183 |
| 2008/0244569 A1 | 10/2008 | Challener et al. | |
| 2009/0064292 A1 | 3/2009 | Carter et al. | |
| 2009/0086979 A1 | 4/2009 | Brutch et al. | |
| 2009/0125974 A1* | 5/2009 | Zhang | G06F 21/53 726/1 |
| 2009/0154709 A1 | 6/2009 | Ellison | |
| 2009/0204964 A1 | 8/2009 | Foley | |
| 2009/0271618 A1 | 10/2009 | Camenisch et al. | |
| 2009/0307487 A1 | 12/2009 | Movva et al. | |
| 2010/0082960 A1 | 4/2010 | Grobman et al. | |
| 2010/0325628 A1 | 12/2010 | Haga et al. | |
| 2011/0029672 A1 | 2/2011 | Agneeswaran | |
| 2011/0154031 A1* | 6/2011 | Banerjee | G06F 21/335 713/165 |
| 2011/0202916 A1 | 8/2011 | VoBa et al. | |
| 2011/0246757 A1 | 10/2011 | Prakash et al. | |
| 2011/0302415 A1 | 12/2011 | Ahmad et al. | |
| 2012/0030676 A1 | 2/2012 | Smith et al. | |
| 2012/0089831 A1 | 4/2012 | Rozas | |
| 2012/0117565 A1* | 5/2012 | Staelin | G06F 9/5072 718/1 |
| 2012/0204020 A1 | 8/2012 | Novak et al. | |
| 2012/0265976 A1 | 10/2012 | Spiers et al. | |
| 2012/0328105 A1 | 12/2012 | Mukkara et al. | |
| 2013/0054979 A1 | 2/2013 | Basmov et al. | |
| 2013/0086383 A1* | 4/2013 | Galvao de Andrade | G06F 21/57 713/171 |
| 2013/0097296 A1 | 4/2013 | Gehrmann et al. | |
| 2013/0191648 A1 | 7/2013 | Bursell | |
| 2014/0007087 A1 | 1/2014 | Scott-Nash et al. | |
| 2014/0019753 A1* | 1/2014 | Lowry | H04L 63/062 713/155 |
| 2014/0019959 A1 | 1/2014 | Dodgson et al. | |
| 2014/0025961 A1 | 1/2014 | Mackintosh et al. | |
| 2014/0052877 A1 | 2/2014 | Mao | |
| 2014/0075494 A1 | 3/2014 | Fadida et al. | |
| 2014/0089658 A1 | 3/2014 | Raghuram et al. | |
| 2014/0089660 A1 | 3/2014 | Sarangshar et al. | |
| 2014/0095868 A1 | 4/2014 | Korthny et al. | |
| 2014/0108784 A1 | 4/2014 | Pendarakis et al. | |
| 2014/0173279 A1 | 6/2014 | Goodman et al. | |
| 2014/0201525 A1 | 7/2014 | Korthny et al. | |
| 2014/0281497 A1 | 9/2014 | Medvinsky et al. | |
| 2015/0019864 A1 | 1/2015 | Pate | |
| 2015/0127795 A1 | 5/2015 | Jagana et al. | |
| 2015/0134965 A1 | 5/2015 | Morenius et al. | |
| 2015/0135311 A1 | 5/2015 | MacKintosh et al. | |
| 2015/0143508 A1 | 5/2015 | Halibard | |
| 2015/0188917 A1 | 7/2015 | McCarron et al. | |
| 2015/0318986 A1 | 11/2015 | Novak et al. | |
| 2015/0319160 A1 | 11/2015 | Ferguson et al. | |
| 2016/0140343 A1 | 5/2016 | Novak et al. | |

FOREIGN PATENT DOCUMENTS

| | | |
|---|---|---|
| WO | 2007087558 A2 | 8/2007 |
| WO | 2009123640 | 10/2009 |
| WO | 2012024508 A2 | 2/2012 |

OTHER PUBLICATIONS

Berger, et al., "vTPM: Virtualizing the Trusted Platform Module" In Proceedings of the 15th Conference on USENIX Security Symposium—vol. 15, Article No. 21, Jul. 31, 2006, 16 pages.

"International Preliminary Report on Patentability Issued in PCT Patent Application No. PCT/US2014/071773", Mailed Date: Nov. 19, 2015, 8 Pages.

U.S. Appl. No. 14/542,341, filed Nov. 14, 2014, Novak et al.

U.S. Appl. No. 61/988,786, filed May 5, 2014, Nystrom et al.

Aslam, et al., "Securely Launching Virtual Machines on Trustworthy Platforms in a Public Cloud—An Enterprise's Perspective", In Proceedings of the 2nd International Conference on Cloud Computing and Services Science, Apr. 18, 2012, 10 pages.

Goyette, Rich, "A Review of vTPM: Virtualizing the Trusted Platform Module", In Proceedings of Network Security and Cryptography, Nov. 13, 2007, 4 pages.

"International Search Report & Written Opinion for PCT Patent Application No. PCT/US2015/028991", Mailed Date: Aug. 20, 2015, 9 pages.

Garfinkel, et al., "Terra: A Virtual Machine-Based Platform for Trusted Computing", In Proceedings of the 19th ACM symposium on Operating systems principles, Oct. 19, 2003, 14 pages.

Berger, et al., "Security for the Cloud Infrastructure: Trusted Virtual Data Center Implementation", In Proceedings of IBM Journal of Research and Development, vol. 53, Issue 4, Jul. 2009, 12 pages.

Olzak, Tom, "Chapter 8—UEFI and the TPM: Building a foundation for platform trust", Published on: Jun. 19, 2012. Available at <<http://www.wayback.archive.org/web/20131018023117/http:/resources.infosecinstitute.com/uefi-and-tpm-2>>.

"International Search Report & Written Opinion Issued in PCT Application No. PCT/US2015/28995", Mailed Date: Aug. 26, 2015, 11 Pages.

"Second Written Opinion Issued in PCT Application No. PCT/US2015/28995", Mailed Date: Mar. 16, 2016, 5 Pages.

Office Action dated May 5, 2016 cited in U.S. Appl. No. 14/542,341.

"International Preliminary Report on Patentability Issued in PCT Application No. PCT/US2015/28991", Mailed Date: Apr. 4, 2016, 7 Pages.

Notice of Allowance dated May 25, 2016 cited in U.S. Appl. No. 14/504,096.

Office Action dated Jun. 20, 2016 cited in U.S. Appl. No. 14/481,399.

International Search Report and Written Opinion for PCT Application No. PCT/US2015/058700, mailed Jul. 18, 2016.

International Preliminary Report on Patentability for PCT Application No. PCT/US2015/028995, mailed Aug. 4, 2016.

Notice of Allowance dated Aug. 19, 2016 cited in U.S. Appl. No. 14/542,341.

Second Written Opinion Issued in PCT Application No. PCT/US2015/058700, Mailed Date: Sep. 28, 2016, 6 Pages.

Notice of Allowance dated Oct. 20, 2016 cited in U.S. Appl. No. 14/504,096.

* cited by examiner

VIRTUAL MACHINE ASSURANCES

BACKGROUND

As computing devices have become more powerful, the execution of one or more virtual environments on a computing device has become more practical. A virtual environment may include a hardware abstraction of a computing device such that computer-executable instructions executing within the virtual environment cannot tell that they are not being executed directly on the hardware abstracted. With concerns over computer security, a virtual machine user may want to have assurances regarding the integrity of the virtual machine and the hosting environment.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to virtual machines. In aspects, when a host is reset or powered on, a measured boot is performed. If the measured boot indicates that the host is in a state that satisfies a policy for gaining access to a cryptographic key, the cryptographic key may be obtained. The cryptographic key may be used, directly or indirectly, to decrypt data of a virtual storage device. This decrypted data may then be used to instantiate a virtual machine.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

The term data is to be read broadly to include anything that may be represented by one or more computer storage elements. Logically, data may be represented as a series of 1's and 0's in volatile or non-volatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program state, program data, other data, and the like.

Headings are for convenience only; information on a given topic may be found outside the section whose heading indicates that topic.

Other definitions, explicit and implicit, may be included below.

Exemplary Operating Environment

Figure 1:
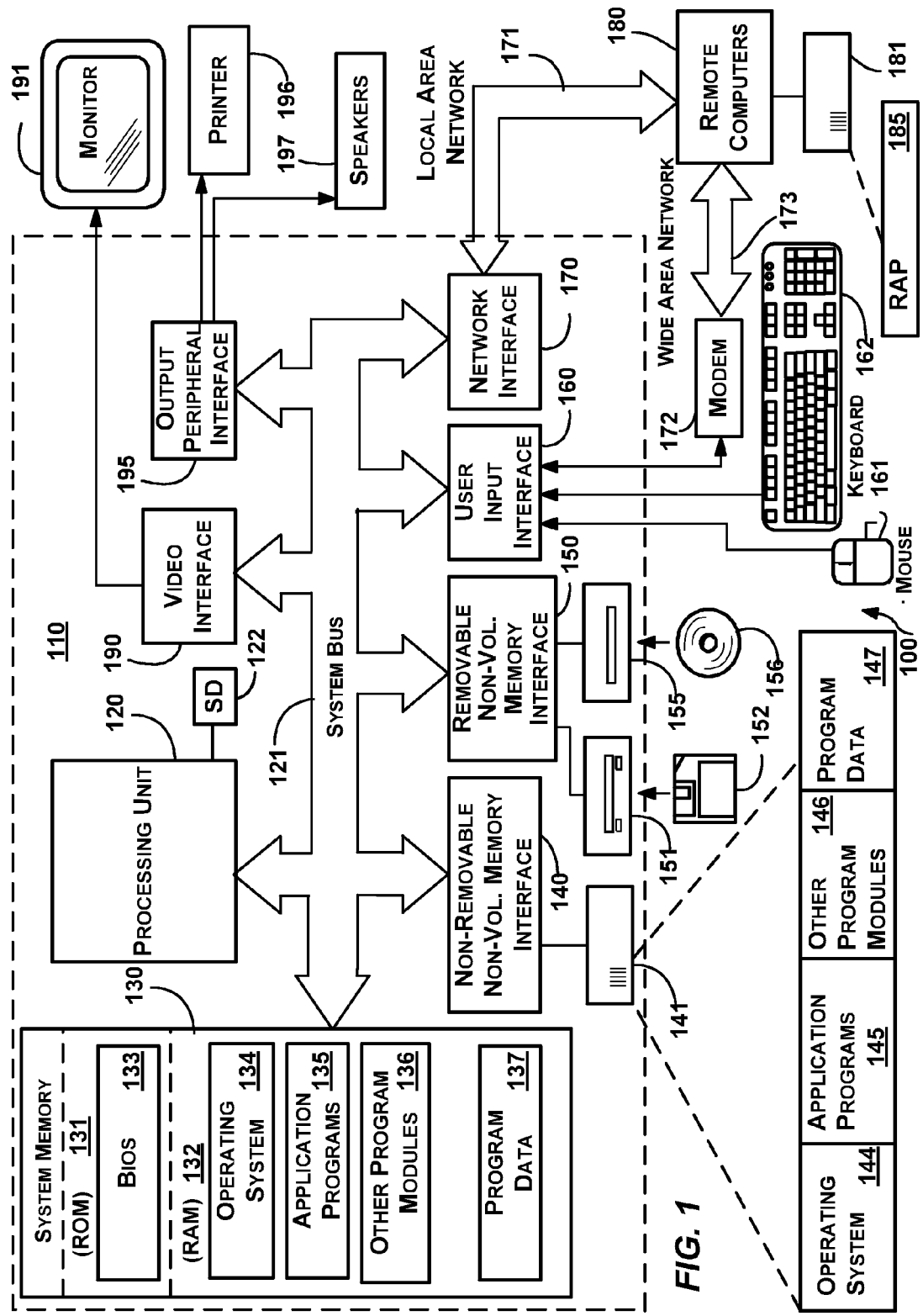
FIG. 1 is a block diagram representing an exemplary computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers—whether on bare metal or as virtual machines—, hand-held or laptop devices, multiprocessor systems, microcontroller-based systems, set-top boxes, programmable and non-programmable consumer electronics, network PCs, minicomputers, mainframe computers, personal digital assistants (PDAs), gaming devices, printers, appliances including set-top, media center, or other appliances, automobile-embedded or attached computing devices, other mobile devices, phone devices including cell phones, wireless phones, and wired phones, distributed computing environments that include any of the above systems or devices, and the like. While various embodiments may be limited to one or more of the above devices, the term computer is intended to cover the devices above unless otherwise indicated.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Alternatively, or in addition, the functionality described herein may be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and the like.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and one or more system buses (represented by system bus 121) that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The processing unit 120 may be connected to a hardware security device 122. The security device 122 may be able to generate and securely store cryptographic keys that may be used to secure various aspects of the computer 110. In one embodiment, the security device 122 may comprise a Trusted Platform Module (TPM) chip, TPM Security Device, or the like.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and non-volatile, removable and non-removable media implemented in any method or technology for storage of information such as computer-readable instructions, data structures, program modules, or other data. Computer storage media includes RAM, ROM, EEPROM, solid state storage, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110. Computer storage media does not include communication media.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM, DVD, or other optical media. Other removable/non-removable, volatile/nonvolatile computer storage media that can be used in the exemplary operating environment include magnetic tape cassettes, flash memory cards and other solid state storage devices, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable nonvolatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone (e.g., for inputting voice or other audio), joystick, game pad, satellite dish, scanner, a touch-sensitive screen, a writing tablet, a camera (e.g., for inputting gestures or other visual input), or the like. These and other input devices are often connected to the processing unit 120 through a user input interface 160 that is coupled to the system bus, but may be connected by other interface and bus structures, such as a parallel port, game port or a universal serial bus (USB).

Through the use of one or more of the above-identified input devices a Natural User Interface (NUI) may be established. A NUI, may rely on speech recognition, touch and stylus recognition, gesture recognition both on screen and adjacent to the screen, air gestures, head and eye tracking, voice and speech, vision, touch, gestures, machine intelligence, and the like. Some exemplary NUI technology that may be employed to interact with a user include touch sensitive displays, voice and speech recognition, intention and goal understanding, motion gesture detection using depth cameras (such as stereoscopic camera systems, infrared camera systems, RGB camera systems, and combinations thereof), motion gesture detection using accelerometers/gyroscopes, facial recognition, 3D displays, head, eye, and gaze tracking, immersive augmented reality and virtual reality systems, as well as technologies for sensing brain activity using electric field sensing electrodes (EEG and related methods).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include phone networks, near field networks, and other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172, network card, or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Assurances

Figure 2:
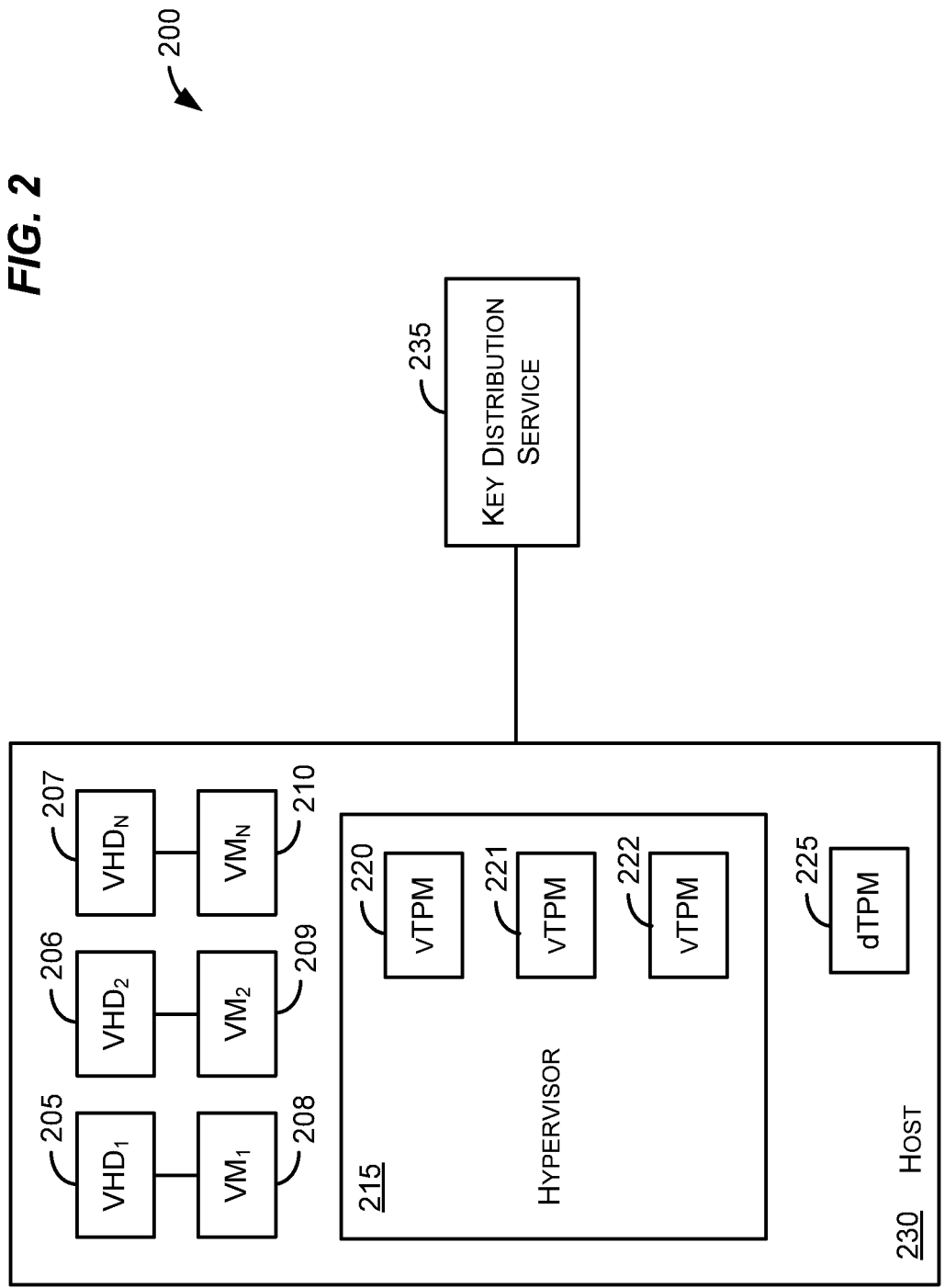
FIGS. 2-5 are block diagrams that generally represents exemplary components of systems configured in accordance with aspects of the subject matter described herein.

As mentioned previously, with a virtual machine, a user may want to have assurances regarding the integrity of the virtual machine and the hosting environment. FIG. 2 is a block diagram that generally represents exemplary components of a system configured in accordance with aspects of the subject matter described herein. The components illustrated in FIG. 2 are exemplary and are not meant to be all-inclusive of components that may be needed or included. Furthermore, the number of components may differ in other embodiments without departing from the spirit or scope of aspects of the subject matter described herein. In some embodiments, the components described in conjunction with FIG. 2 may be included in other components (shown or not shown) or placed in subcomponents without departing from the spirit or scope of aspects of the subject matter described herein. In some embodiments, the components and/or functions described in conjunction with FIG. 2 may be distributed across multiple devices.

The term "function" as used herein may be thought of as a portion of code that performs one or more tasks. Although a function may include a block of code that returns data, it is not limited to blocks of code that return data. A function may also perform a specific task without returning any data. Furthermore, a function may or may not have input parameters. A function may include a subroutine, a subprogram, a procedure, method, routine, or the like.

As used herein, the term component may be read in alternate implementations to include hardware such as all or a portion of a device, a collection of one or more software modules or portions thereof, some combination of one or more software modules or portions thereof and one or more devices or portions thereof, or the like. In one implementation, a component may be implemented by structuring (e.g., programming) a processor (e.g., the processing unit 120 of FIG. 1) to perform one or more actions.

For example, the components illustrated in FIG. 2 may be implemented using one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like.

An exemplary device that may be configured to implement one or more of the components of FIG. 2 comprises the computer 110 of FIG. 1.

In one implementation, a component may also include or be represented by code. Code includes instructions that indicate actions a computer is to take. Code may also include data, resources, variables, definitions, relationships, associations, and the like that include information other than actions the computer is to take. For example, the code may include images, Web pages, HTML, XML, other content, and the like.

Code may be executed by a computer. When code is executed by a computer, this may be called a process. The term "process" and its variants as used herein may include one or more traditional processes, threads, components, libraries, objects that perform tasks, and the like. A process may be implemented in hardware, software, or a combination of hardware and software. In an embodiment, a process is any mechanism, however called, capable of or used in performing an action. A process may be distributed over multiple devices or a single device. Code may execute in user mode, kernel mode, some other mode, a combination of the above, or the like.

Although the terms "client" and "server" are sometimes used herein, it is to be understood, that a client may be implemented on a machine that has hardware and/or software that is typically associated with a server and that likewise, a server may be implemented on a machine that has hardware and/or software that is typically associated with a desktop, personal, or mobile computer. Furthermore, a client may at times act as a server and vice versa. At times, two or more entities that more frequently act as a client or server may concurrently be peers, servers, or clients. In an embodiment, a client and server may be implemented on the same physical machine.

For simplicity in explanation, some of the actions described below are described in a certain sequence. While the sequence may be followed for some implementations, there is no intention to limit other implementations to the particular sequence. Indeed, in some implementations, the actions described herein may be ordered in different ways and may proceed in parallel with each other.

The term "virtual hard drive" as used herein is exemplary only. In other alternatives, other virtual storage devices such as a virtual floppy, virtual solid state storage, or other virtual read-write media, a virtual CD ROM, DVD, or other virtual read-only media may be substituted without departing from the spirit or scope of aspects of the subject matter described herein. The term virtual storage device is intended to cover any type of virtual storage device including, for example, the ones mentioned above.

A virtual storage device may include or be associated with metadata that is meant for use by a hypervisor. In some implementation (described in more detail below), this metadata may be hidden and not viewable by a virtual machine hosted by the hypervisor. For example, in implementations with virtual trusted platform modules (vTPMs), a virtual machine may only have a view of a virtual storage device as given by the hypervisor. This view excludes the metadata meant for use by the hypervisor. In these implementations, the virtual machine, using the vTPM, may only encrypt or decrypt what is in the view.

In other implementations (described in more detail below) where there are no vTPMs, an entire virtual storage device including the metadata meant for use by the hypervisor may be encrypted. In these implementations, after obtaining a key from a key distribution service, the hypervisor may decrypt the entire virtual storage device including the metadata meant for use by the hypervisor.

Turning to FIG. 2, the system 200 may include a host 230, a key distribution service 235, and other components (not shown). The host 230 may be suitable for hosting the one or more virtual machines 208-210 that may be associated with the virtual hard drives 205-207. The host 230 may host one or more virtual machines (e.g., the virtual machines 208-210). A virtual machine may be associated with one or more virtual hard drives (e.g., one or more of the virtual hard drives 205-207). The host 230 may include a hypervisor 215 and a discrete trusted platform module 225 or other security device.

The hypervisor 215 is a component that creates a virtual environment in which the virtual machines 208-210 may operate. The hypervisor 215 may be implemented in software, firmware, hardware, a combination of two or more of the above, or the like. The hypervisor 215 may execute directly on the host 230's hardware or may execute within an operating system environment hosted on the host 230.

Throughout this document, the term trusted platform module (TPM) is frequently used. TPMs are well understood by those skilled in the art. The use of the term TPM, however, is not intended to limit aspects of the subject matter described herein solely to devices that comply with one or more versions of standards for implementing TPMs. Instead, this term is used as one example of a security component that may be used in accordance with aspects of the subject matter described herein.

In other implementations, other security components that provide security functionality may also be used without departing from the spirit or scope of aspects of the subject matter described herein. For example, a security device may have characteristics including at least the following:

1. Protected memory. A security device may include memory to which only the security device may write. This memory may be used to store measurements, to seal and unseal, and for other cryptographic functions.

2. A means for identifying the security device. For example, a security device may include a secret that only the device knows and that distinguishes the device from other devices.

3. A means for performing attestation. The security device may have a processor or other circuitry that may be used to create trusted messages about any asset controlled by the security device. Some exemplary assets controlled by the security device may include a cryptographic object, a sealed blob, a state of a platform with which the security device is associated, or the like Although security devices are often thought of as separate discrete components, this is not required. For example, in one implementation, firmware coupled with a processor may be used as a security device.

When the term TPM is used herein, it is to be understood that in alternative implementations other security devices (including those mentioned herein) may be used without departing from the spirit or scope of aspects of the subject matter described herein.

To aid in understanding, some of the features of TPMs are described below, but there is no intention to detail all the features of a TPM. Furthermore, by describing some of the features of a TPM herein, there is no intention to limit the types of security devices that may be used to the ones having the features described.

Among other things, a TPM may include a set of one or more registers in which it may store data. The registers may be volatile such that they maintain data while the host is powered and may be reset upon power down or reset of the host. The registers may be used for storing measurements that may be used to ensure that a host hosting the TPM is in a certain state.

A measurement may be represented by data. In one implementation, a measurement corresponds to a hash of code and/or configuration data. In another implementation, a measurement may include a characteristic of code such as a signature of the code. In another implementation, a measurement may include an identity of an authority that approved the code. The exemplary implementations above are not intended to be all-inclusive or exhaustive. Based on the teachings herein, those skilled in the art may recognize other measurements that may be used without departing from the spirit or scope of aspects of the subject matter described herein.

Measurements may be taken at various times. For example, prior to executing firmware, a hash of the firmware may be computed and provided as a measurement to a TPM. Prior to executing an operating system boot loader, a hash of the boot loading code may be computed and provided as a measurement to a TPM. Prior to executing one or more component of the operating system, a hash of the code of the components may be computed and provided as a measurement to a TPM. A measured boot may include taking measurements at certain points (e.g., before executing code) in a boot chain from power on up to and including launch of an operating system kernel, hypervisor, and/or boot-critical drivers.

When a measurement is needed, a component external to the TPM may do whatever computations are necessary for the measurement and then provide data representing the measurement to the TPM. The TPM may then update an indicated register using the provided measurement. The computations may involve, for example, reading code into memory and performing a hash on the code to obtain a measurement.

In conjunction with providing a measurement to a TPM, an indication of a TPM register may also be passed. When a TPM receives a measurement together with an indicated register, the TPM may update the register in such a way as to maintain history regarding what has been measured into the register. One way to do this is to concatenate the measurement received with what is currently in the register and to perform a cryptographic hash on the result. The output of the cryptographic hash may then be written back to the register.

While a component may provide a measurement and indicate a TPM register, the component is not allowed to write directly to the register. In other words, registers of a TPM cannot be written to by components external to the TPM.

In one implementation, the hypervisor 215 may manage one or more virtual TPMs (vTPMs) 220-222. Each vTPM may be associated with a virtual machine (e.g., one of the virtual machines 205-207). In this implementation, the hypervisor 215 may store data representing the vTPMs in a secure memory of the hypervisor 215 that is not available to components outside of the hypervisor 215. To gain access to a vTPM, an attacker may be required to gain control of the hypervisor 215 itself.

Figure 3:
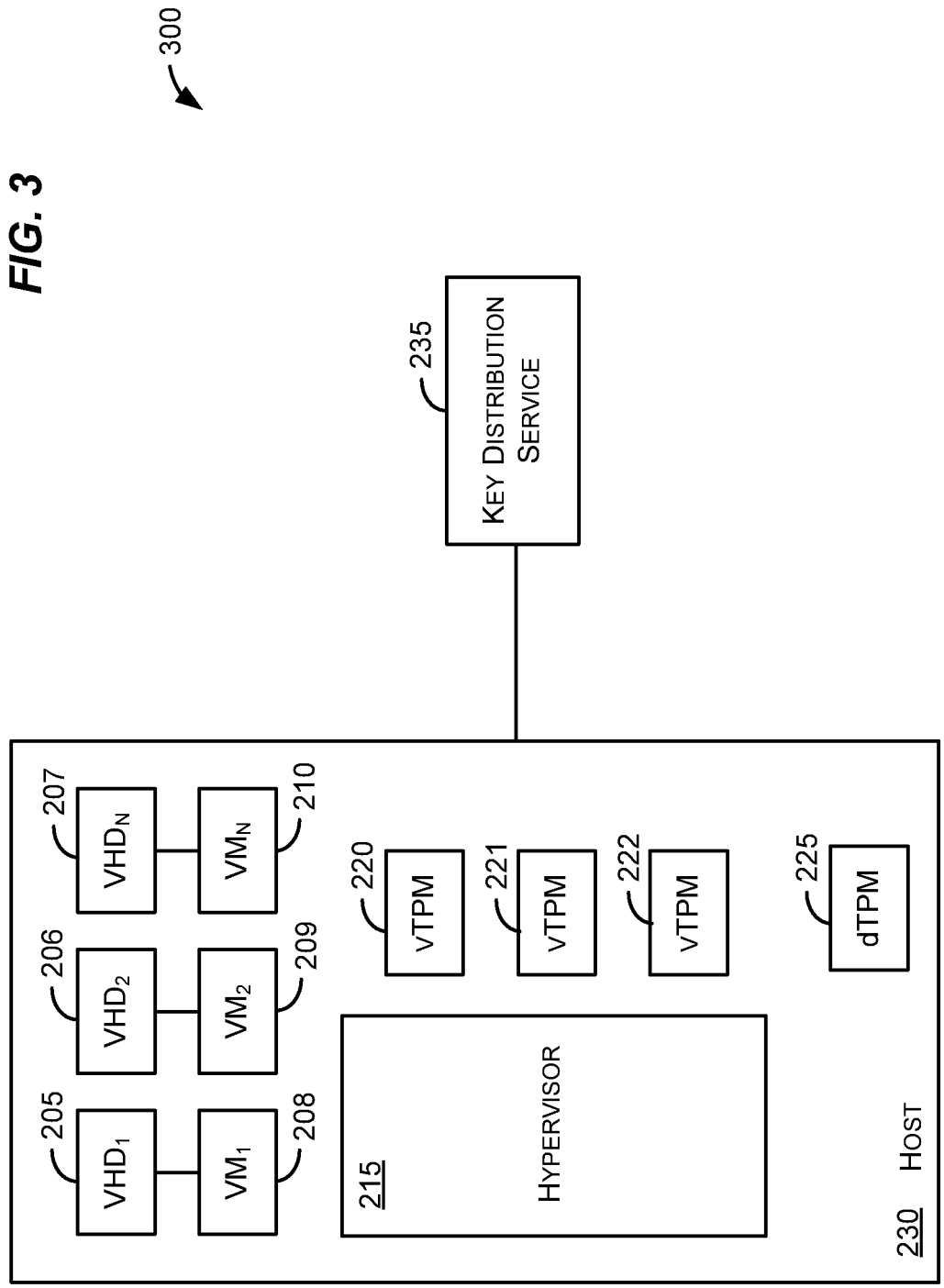

In another implementation, the host 230 may manage the vTPMs 220-222. In this implementation, users and processes with administrator privileges may have access to the vTPMs 220-222. This implementation is illustrated in FIG. 3. As illustrated in FIG. 3, the system 300 has the vTPMs 220-222 managed outside of the hypervisor 215.

Figure 4:
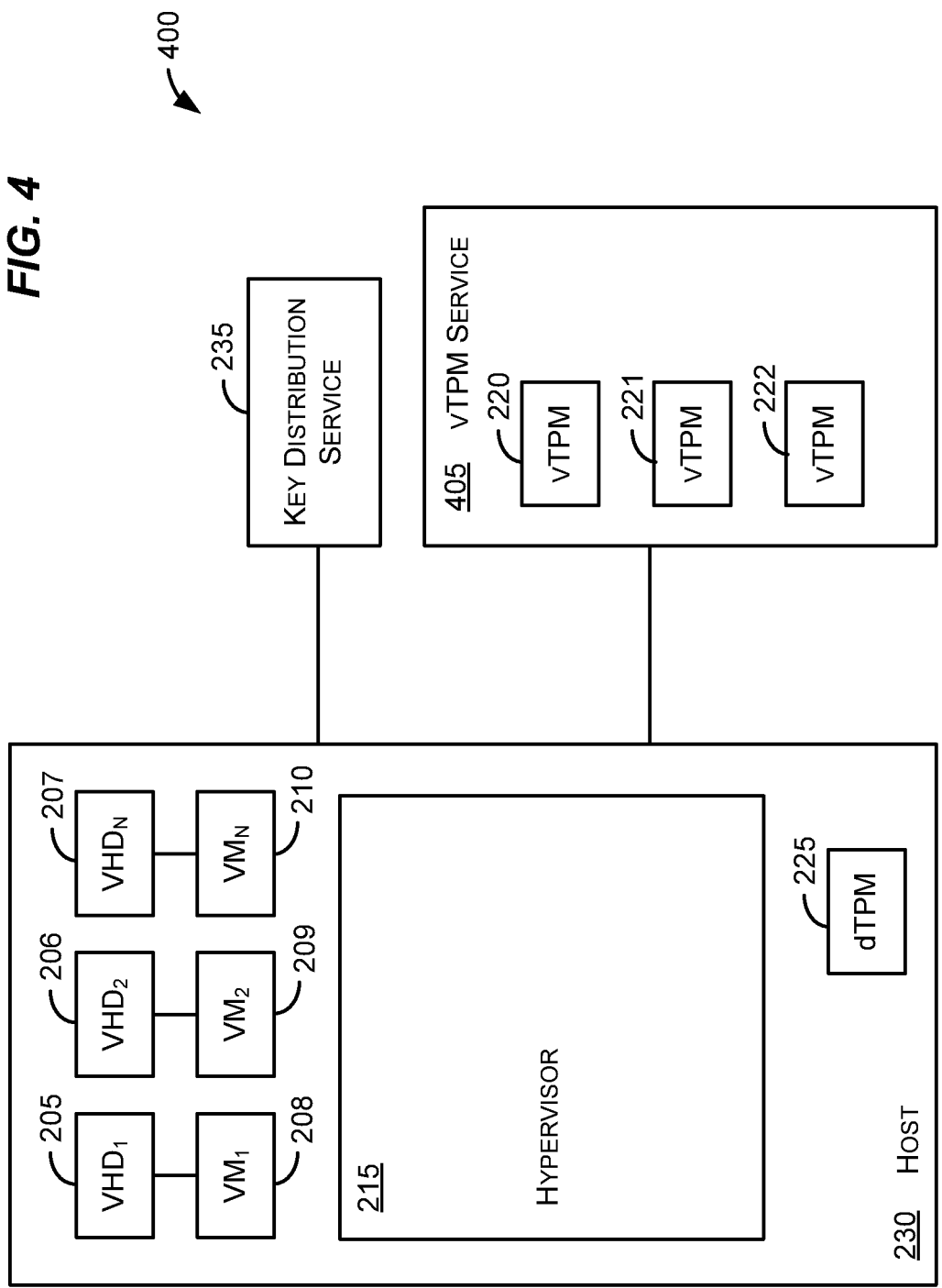

In yet another implementation, a service external to the host 230 may manage the vTPMs 220-222. This implementation is illustrated in FIG. 4. As illustrated in FIG. 4, the system 400 has the vTPMs 220-222 managed by a vTPM service 405 external to the host 230.

Figure 5:
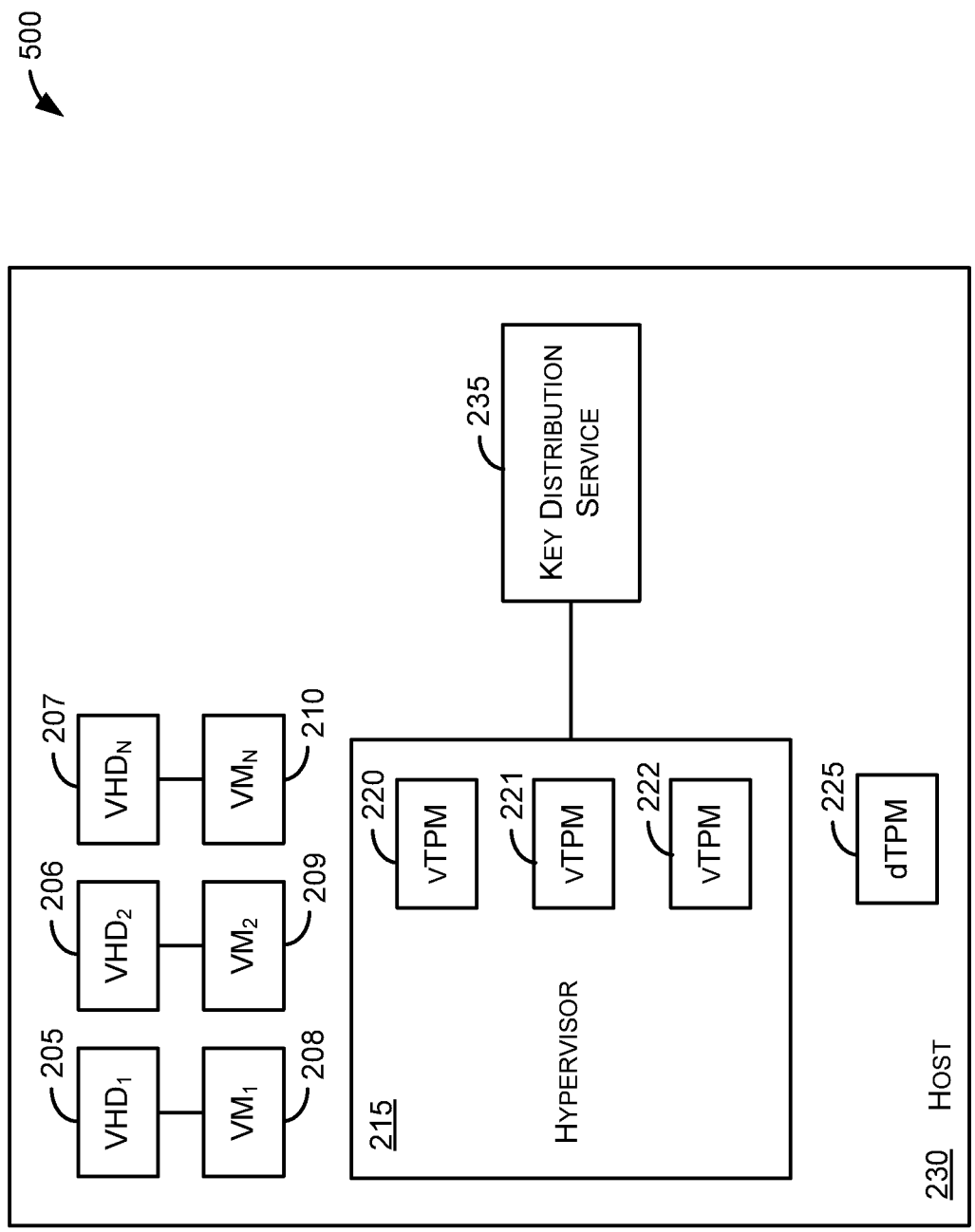

In one implementation, the key distribution service 235 may be hosted external to the host 230. In another implementation, the key distribution service 235 may be hosted on the host 230 as illustrated in FIG. 5. As illustrated in FIG. 5, the system 500 has the key distribution service 235 hosted on the host 230.

Returning to FIG. 2, the system 200 may be hosted in a public or private cloud. The cloud is a term that is often used as a metaphor for the Internet. It draws on the idea that computation, software, data access, storage, and other resources may be provided by entities connected to the Internet (or other network) without requiring users to know the location or other details about the computing infrastructure that delivers those resources.

The virtual machines 208-210 may be provided via the cloud to one or more tenants. A tenant may be associated with one or more of the virtual machines 208-210. A tenant may include a user, company, or other entity that has rights to access one or more of the virtual machines. The tenant may not want other tenants, the cloud hosting operator, attackers, or other entities to gain access to the tenant's virtual machines. The tenant may also want assurances from the cloud hosting operator that the host hosting a virtual machine of the tenant satisfies certain policies (e.g., that the host's configuration is in a set of one or more states defined by the tenant).

To ensure that the policies are met, in one implementation, the tenant may require that all or portions of the virtual hard drives associated with the virtual machines are encrypted with a secret key. An encrypted virtual hard drive may only be unencrypted if the secret key is known. Without its associated virtual hard drive, a virtual machine may not be able to be executed.

While the singular form of policy is sometimes referred to herein, it is to be understood that the operations herein may also be applied to multiple policies. For example, a sealed key may be unsealed if a host complies with any one of a set of acceptable policies. Likewise, a key distribution service may provide a key for accessing a vTPM if a hypervisor provides evidence that a host state satisfies any one of a set of acceptable policies. For example, a hypervisor may provide this evidence by providing an attestation of the host state by a TPM of the host.

In one implementation, the secret key that may be used to decrypt a virtual hard drive may be the same key that is provided by the key distribution service 235. In this implementation, the vTPMs 220-222 may not be needed. Once the secret key is obtained from the key distribution service 235, this key may be used to decrypt a virtual hard drive.

In another implementation, the secret key that can decrypt a virtual hard drive of a virtual machine may be sealed to a vTPM that is associated with the virtual machine. The sealing may involve one or more registers of the vTPM. The set of registers may be chosen so as to enforce a tenant-selected policy. When a key is sealed via a vTPM, the key may only be obtained from the vTPM if the register(s) used to seal the key include the same data they did when the key was sealed.

Furthermore, the vTPM may be protected in such a manner that only a host in possession of the correct key k for the vTPM will be able to access it. One exemplary way to achieve this is as follows:

$$\text{Seal}(indices,k) \rightarrow (C, \text{MAC}_{SRK}((index[0],\text{PCR}_{index[0]}), (index[1],\text{PCR}_{index[1]}),\ldots))$$

Where indices is a selected set of TPM registers, k is the key used to encrypt the virtual hard disk, C is cipher text generated by the seal operation, $\text{MAC}_{SRK}$ is an algorithm used to create C that uses a storage root key (SRK) of the dTPM 225 or, in an alternative implementation, a key of the key distribution service 235, and $\text{PCR}_{index[i]}$ is an register of the dTPM 225 indicated by index[i]. In one implementation, only the public part of the SRK is needed for the sealing operation. The resulting cipher text C is made available to the host 230. The seal operation may be conducted, for example, by the key distribution service 235.

On power-on, the host 230 conducts a measured boot. The host 230 may then attempt to unseal the cipher text C via an unseal operation as follows:

$$\text{Unseal}(C, \text{MAC}_{SRK}((\text{index}[0], \text{PCR}_{index[0]}), (\text{index}[1], \text{PCR}_{index[1]}), \ldots) \to k$$

The unseal operation may be performed by the key distribution service 235 or by the host 230 based on key distribution as described below. If the unseal operation is performed by the distribution service 235, the host may pass the key distribution service 235 the data measured by the dTPM 225 in a package signed by the dTPM. If the unseal operation is performed by the host 230, the host may use a previously distributed key that may only be unsealed on the host 230 if the host 230 is in a state (as measured by the dTPM 225) that satisfies policy.

If all the registers are in the correct state (meaning that the host 230 is in a state compliant with the policy), the unseal will succeed and the host 230 will be provided with a key to decrypt the virtual machine's vTPM or a key to decrypt VHD(s) directly (as described in more detail below). At this point the virtual machine may boot, since the vTPM is available to unseal the key necessary to decrypt the VHD(s) of the virtual machine. If the vTPM state after boot is in accordance with the tenant's policy, an unlock will occur. As the virtual machine unlocks, it may also seek to do an attestation based on its current vTPM state. This attestation allows the virtual machine to demonstrate its compliance to tenant policies to other tenant resources.

At this point, the following objectives have been achieved:

1. Through the attestation done by executing the virtual machine, the tenant is assured that the virtual machine is in compliance with tenant-set virtual machine policies;

2. Because of the sealing of the key that encrypts VHD(s) of the virtual machine, the tenant is assured that the VHD content has not been modified; and 3. Because of the vTPM sealing, the tenant is assured that the virtual machine is running on a host that is in compliance with set policies for hosts.

To also protect against modification of a VHD's contents during runtime, a code integrity policy may be implemented on the host.

In an alternative implementation, instead of a key distribution service 235 performing an unseal operation, the key distribution service 235 may simply provide a key to decrypt a virtual hard drive. For example, the host 230 may pass the key distribution service 235 the data measured by the dTPM 225 in a package signed by the dTPM and the key distribution service 235 may respond by providing the host with a key to decrypt a virtual hard drive.

In one implementation, the vTPM data that the key k protects is the vTPM's endorsement primary seed and storage primary seed, since everything else either is ephemeral, public, or can be derived. In another implementation, the key k may protect data in addition to the primary seed and the storage primary seed.

In one implementation, the key distribution service 235 may be controlled by the tenant. In another implementation, the key distribution service 235 may be controlled by the hoster (e.g., a cloud operator that operates the host 230). In the first implementation, the tenant maintains complete control over the keys necessary to decrypt a vTPM (and through it, a virtual machine), but may need to bear the burden of maintaining a connection to the hoster in order to allow virtual machines to boot. In the second implementation, the tenant may let the poster (e.g., a separate part of the hoster's organization) run the key distribution service 235. In one implementation, this may be done such that at least two entities in the hoster's organization are required to cooperate in order to access a tenant vTPM key k.

Keys usable to decrypt a vTPM may be distributed in a variety of ways. For example, in one implementation, a key may be distributed any time after it is known what state(s) of the host satisfy policy. For example, after configuring the host 230 in a state that satisfies policy, the state of one or more registers of the dTPM may be signed by the dTPM 225 and sent to the key distribution service 235. After receiving this, the key distribution service 235 may immediately or any time thereafter send the host 230 a key encrypted or wrapped in such a way that the host 230 may only unencrypt the key when the host 230 is in a state that satisfies the policy. Encrypting the key in this manner may involve encrypting the key with a public key of a host's TPM as well as state that satisfies policy (as measured by the host's TPM).

In another implementation, the key distribution service 235 may wait until a key is requested before providing the key. In this implementation, the key distribution service 235 may verify the state of the requesting machine prior to providing a key. If the key satisfies policy, the key may be provided by the key distribution service 235; otherwise, the key distribution service 235 may withhold the key from the requestor.

The examples of key distribution above are exemplary only. Based on the teachings herein, those skilled in the art may recognize other ways of distributing keys that may also be used without departing from the spirit or scope of aspects of the subject matter described herein.

The teachings above may be applied to secure machines that either do not have a security device or that have an older version of a security device. For example, some machines may not have a TPM at all. Other machines may have a TPM, but the TPM may be implemented according to an old TPM standard. Some operating systems may not execute unless they have access to a TPM implemented according to a certain version or greater.

To remedy such platforms as the ones described above, the platform may be configured with a hypervisor. The hypervisor may then be used to execute an operating system in a virtual environment. When the operating system requests access to a TPM, the hypervisor may supply a virtual TPM of the appropriate version. The hypervisor may secure the virtual TPM so only the hypervisor may change the protected memory of the virtual TPM. As far as the operating system is concerned, the virtual TPM looks just like a discrete physical TPM.

Furthermore, the seeding secret used to create the virtual TPM may be entered via a keyboard or other input device, read from a USB or other external-storage device that is disconnected after the seeding secret is used, or the like.

One advantage of the above method for securing machines is that fast hardware of the machine (e.g., a CPU) may be used to perform the functions of the vTPM. This may greatly speed cryptographic functions of the machine.

Where an older-version TPM is available on a machine, this older-version TPM may be used to provide evidence that the machine is in a state in which the machine is allowed to gain access to a vTPM key. Although this may not be as ideal as having a new-version TPM on the machine and using this new-version TPM to gain access to a vTPM key, it may be better than non-TPM solutions.

Figure 6:
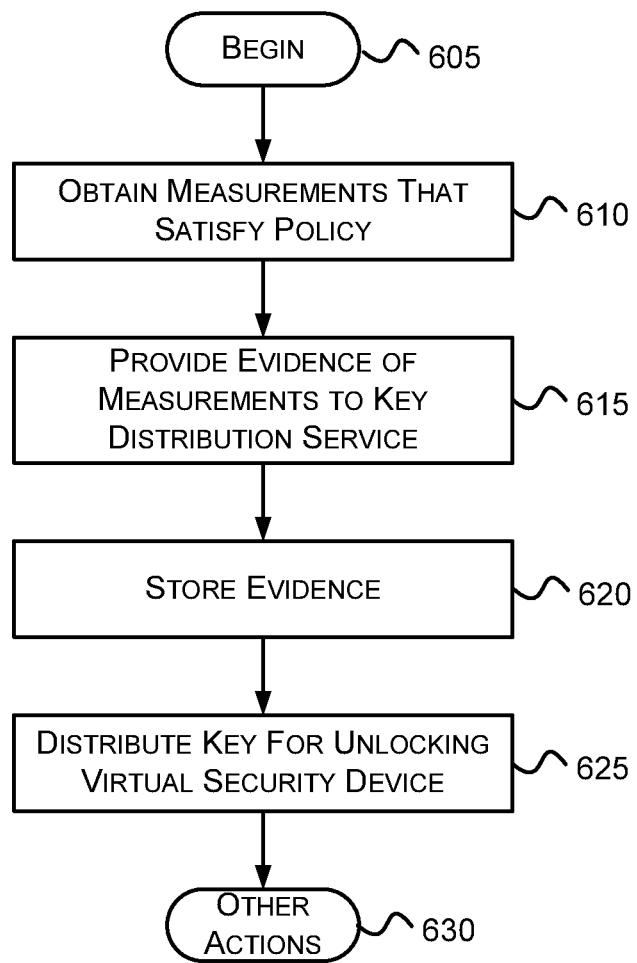
FIG. 6 is a flow diagram that generally represents actions that may occur in preparing a key distribution service to distribute a key in accordance with aspects of the subject matter described herein.
Figure 7:
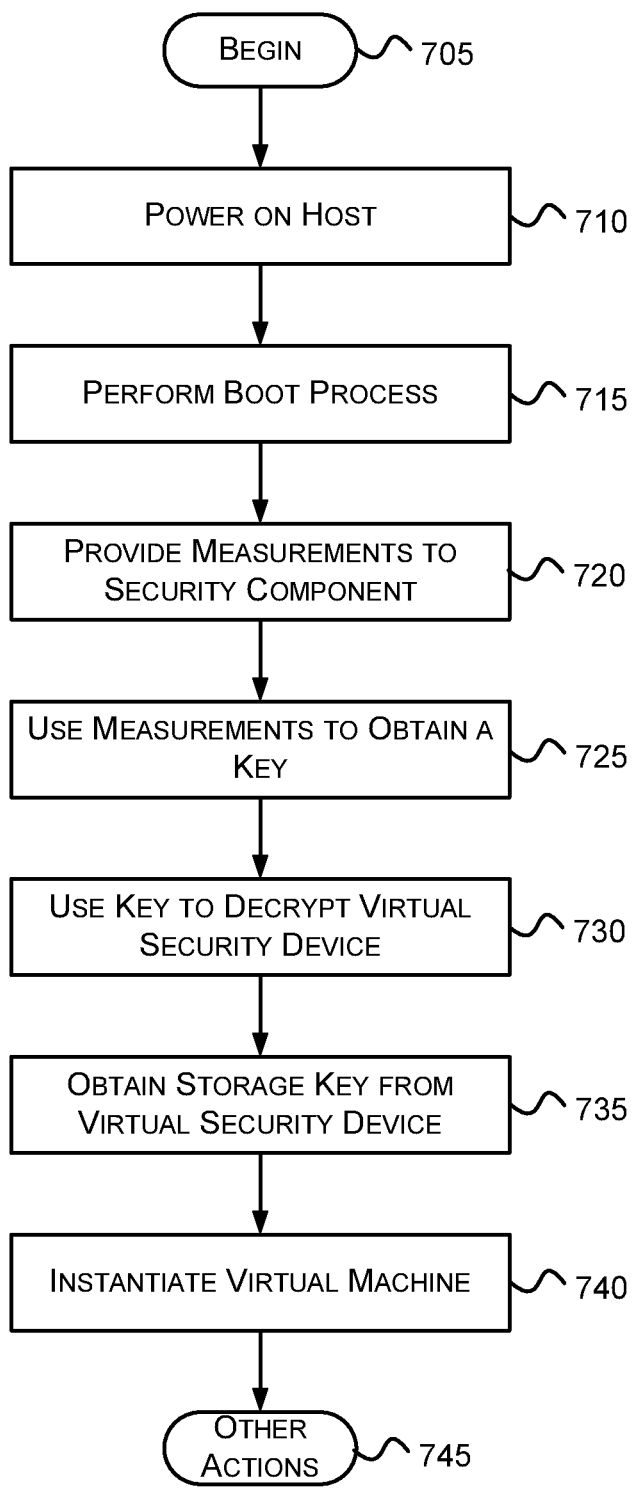
FIG. 7 is a flow diagram that generally represents exemplary actions that may occur in instantiating a virtual machine in accordance with aspects of the subject matter described herein.
Figure 8:
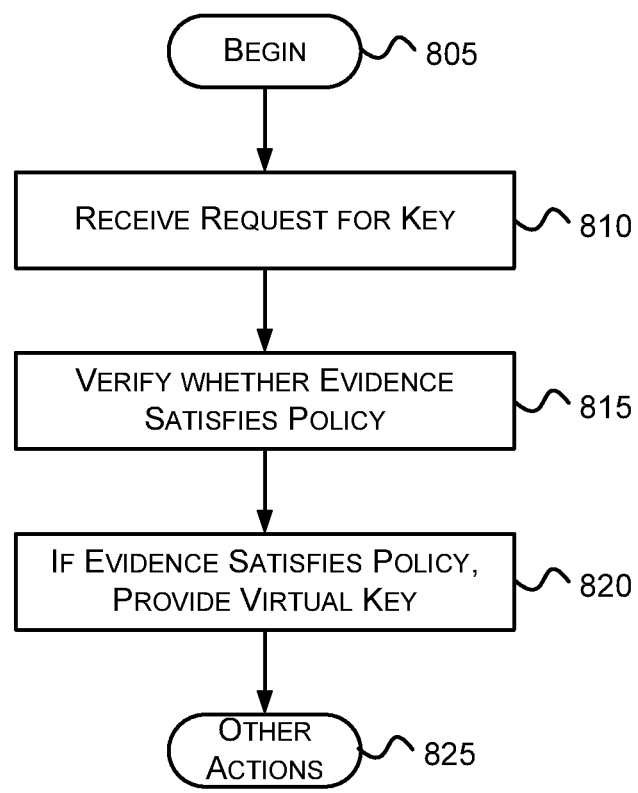
FIG. 8 is a flow diagram that generally represents exemplary actions that may be taken by a key distribution service in accordance with aspects of the subject matter described herein.

FIGS. 6-8 are flow diagrams that generally represent exemplary actions that may occur in accordance with aspects of the subject matter described herein. For simplicity of explanation, the methodology described in conjunction with FIGS. 6-8 is depicted and described as a series of acts. It is to be understood and appreciated that aspects of the subject matter described herein are not limited by the acts illustrated and/or by the order of acts. In one embodiment, the acts occur in an order as described below. In other embodiments, however, two or more of the acts may occur in parallel or in another order. In other embodiments, one or more of the actions may occur with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

FIG. 6 is a flow diagram that generally represents actions that may occur in preparing a key distribution service to distribute a key in accordance with aspects of the subject matter described herein. At block 605, the actions begin.

At block 610, measurements are obtained that satisfy a policy. For example, referring to FIG. 2, the host 230 may be booted and measurements taken at pre-defined states in conjunction with configuring the host 230 into a state that satisfies a policy.

At block 615, evidence of the measurements may be provided to a key distribution service. For example, referring to FIG. 2, the dTPM 225 may be used to obtain security data that include a hash of the measurements that has been signed by the dTPM 225. This security data is indicative of a state of the host that satisfies policy. The security data is derived from the measurements via the hash. This security data may then be provided to the key distribution service 235.

At block 620, the evidence may be stored. For example, referring to FIG. 2, the key distribution service 235 may store the evidence in a storage (not shown) accessible to the key distribution service 235. The key distribution service 235 may associate the evidence with identifier(s) of a particular vTPM, hypervisor, host, virtual machine, or the like so that, for example, the evidence may be compared with subsequently provided evidence before providing a key. In an alternative, the evidence may be discarded by the key distribution service 235 and sealing/unsealing operations may be relied upon to secure the key.

At block 625, the key is distributed for decrypting a virtual security device. As mentioned previously, this may be done in response to a request for a key or prior to such request. For example, referring to FIG. 2, in one implementation, the hypervisor 215 may request a key from the key distribution service 235 and may provide evidence of compliance with policy to the key distribution service 235. In response, the key distribution service 235 may verify whether the evidence does in fact satisfy a policy and if so, provide the cryptographic key to the hypervisor 215.

In another implementation, the key distribution service 235 may supply a sealed key to the host 230 at any time after receiving the security data mentioned above. The key may be sealed such that the host 230 may not unseal the key unless the host is in a state that satisfies policy.

At block 630, other actions, if any, may be performed.

FIG. 7 is a flow diagram that generally represents exemplary actions that may occur in instantiating a virtual machine in accordance with aspects of the subject matter described herein. At block 705, the actions begin.

At block 710, the host is powered on. For example, referring to FIG. 2, the host 230 may be powered on by activating an on switch. In addition to physically powering on the host, in an alternative, the term power on may also refer to causing the host 230 to reboot without physically turning on or off the power to the host 230.

At block 715, a boot process is performed. A boot process includes actions needed to prepare a host to execute a virtual machine. These actions include instantiating a virtual environment suitable for hosting a virtual machine. A boot process may include, for example:

1. Loading and executing firmware;
2. Loading and executing a boot loader;
3. Loading and executing components of a hypervisor, operating system, or other code; and
4. Other actions need to prepare the host to execute a virtual machine.

At block 720, at pre-defined states during the boot process, measurements of the host are provided to a host security component. The pre-defined states may include, for example, each time new code is loaded into memory before the new code is executed, a subset of the times new code is loaded into memory before the new code is loaded, after one or more code segments are executed, or other states. For example, referring to FIG. 2, the host may perform a measured boot and provide measurements to the dTPM 225.

At block 725, the measurements as measured into the host security component may be used to obtain a cryptographic key. The measurements may be indicative that the host is in a state that satisfies a policy for hosting a certain virtual machine. In one implementation, obtaining a cryptographic key may include:

1. From a key distribution service, obtaining sealed data that is sealed to a state of the host (Note that this key may be distributed as soon as it is available.); and
2. Unsealing the sealed data via the host security component. The host security component may be configured to unseal the sealed data only if the measurements are indicative that the host is in a state that satisfies the policy for hosting the virtual machine.

For example, referring to FIG. 2, the key distribution service 235 may provide a key to the host 230 that is sealed to a state of the host 230 that satisfies a policy. The host 230 may use the dTPM 225 to unseal the key only if the host 230 is in a state that satisfies the policy.

In another implementation, obtaining a cryptographic key may include:

1. After the virtual environment is instantiated, sending a request for a cryptographic key and providing evidence that the measurements satisfy a policy for obtaining the cryptographic key; and
2. Receiving the cryptographic key only if the evidence does in fact satisfy the policy.

For example, referring to FIG. 2, after instantiating a virtual environment, the hypervisor 215 may send a request for a cryptographic key for the vTPM 220 to the key distribution service 235 and may provide evidence (e.g., security data generated by the dTPM 225) to indicate that the host 230 is in a state that satisfies a policy for obtaining a cryptographic key for the vTPM 220. The key distribution service 235 may verify via the evidence that the host 230 is in the state and may provide the cryptographic key if the evidence does in fact satisfy the policy.

At block 730, the cryptographic key is used to decrypt data that represents a virtual security device. For example, referring to FIG. 2, the hypervisor 215 may use the cryptographic key obtained from the key distribution service 235 to decrypt the vTPM 220. After decrypting the vTPM 220, the hypervisor 215 may begin executing a virtual machine and provide services of the vTPM 220 to the virtual machine.

At block 735, a storage key may be obtained from the decrypted virtual security device. For example, referring to FIG. 2, the virtual machine 208 may obtain a storage key from the vTPM 220 in the course of booting. This storage key may be used to decrypt the virtual hard drive 205. In an alternative, the hypervisor 215 may directly decrypt the virtual hard drive 205 using a key from the key distribution service 235 (or a key derived from that key).

At block 740, a virtual machine may be instantiated via the decrypted data of the virtual storage device. For example, referring to FIG. 2, the hypervisor may instantiate the virtual machine 208 with the decrypted data of the virtual hard drive 205.

At block 745, other actions, if any, may be performed. For example, the virtual machine, hypervisor, host, or another component may obtain an attestation from a security component and provide the attestation to another entity to assure the other entity that the environment is in a state compliant with a policy of the other entity. The attestation may be based on measurements obtained at pre-defined states during the boot process and may be signed by a private key of the security component.

FIG. 8 is a flow diagram that generally represents exemplary actions that may be taken by a key distribution service in accordance with aspects of the subject matter described herein. At block 805, the actions begin.

At block 810, a request for a key is received. For example, referring to FIG. 2, the key distribution service 235 may receive a request for a key for the vTPM 220. The request may be received from a component (e.g., hypervisor, operating system, or other component) of a host. The key may be transmitted with evidence that measurements satisfy a policy for obtaining the key. The key may be a cryptographic key for a virtual security device (e.g., a vTPM) associated with a virtual machine. The cryptographic key provides decryption data for decrypting either directly or indirectly a virtual storage device associated with the virtual machine. Directly here means that the decryption data may be used as the key. Indirectly means that the decryption data may be used to decrypt other data (e.g., a vTPM) which may be used to decrypt other data and so on (1–n times) to eventually obtain a key to decrypt the virtual storage device.

At block 815, in response to the request, the evidence may be verified to determine whether it satisfies policy. For example, referring to FIG. 2, the key distribution service 235 may verify whether the evidence satisfies a policy that allows the requestor to obtain the key.

At block 820, if the evidence satisfies policy, the key is provided. For example, referring to FIG. 2, the key distribution service may provide the key to the requesting component of the host 230. For additional security, the key may be encrypted in a way that the receiving component, if authentic, can decrypt the key.

At block 825, other actions, if any, may be performed. In another implementation of the key distribution service 235 as mentioned previously, the key distribution service 235 may distribute a key sealed to a state of the host that satisfies tenant policy. The key distribution service 235 may do this at any time after knowing the state.

As can be seen from the foregoing detailed description, aspects have been described related to virtual machine assurances. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method, implemented at a computer system that includes one or more processors, for securely instantiating a virtual machine, the method comprising:
    starting a host that includes a virtual environment for hosting a virtual machine, the virtual environment including a virtual security component associated with the virtual machine;
    performing a boot process to instantiate the virtual environment;
    at pre-defined states during the boot process, providing measurements of the host to a host security component, the measurements identifying a state of the host that satisfies a policy for hosting the virtual machine;
    obtaining a first cryptographic key based on the state of the host, including:
        providing the measurements to a key distribution service external to the host;
        receiving sealed data that is sealed to a state of the host; and
        unsealing the sealed data via the host security component, the host security component configured to unseal the sealed data only when the host security component receives evidence that the host is currently in a state that satisfies the policy for hosting the virtual machine;
    using the first cryptographic key to decrypt the virtual security component associated with the virtual machine;
    from the decrypted virtual security component, obtaining a second cryptographic key associated with a virtual hard drive that is associated with the virtual machine;
    using the second cryptographic key to decrypt the virtual hard drive associated with the virtual machine; and
    instantiating the virtual machine via the associated decrypted virtual hard drive.

2. The method of claim 1, wherein obtaining the first cryptographic key based on the state of the host also includes:
    providing evidence that a current state of the host satisfies a policy for obtaining the first cryptographic key; and
    receiving sealed data only when the evidence satisfies the policy.

3. The method of claim 2, further comprising obtaining the evidence from the host security component, the host security component implemented as a discrete hardware device that is integrated with the host and that has protected memory to which only the host security component is allowed to write.

4. The method of claim 3, wherein obtaining the evidence from the host security component comprises obtaining data that has been signed by a secret key of the host security component, the data derived by hashing volatile registers of the host security component, the volatile registers indicative of measurements provided to the host security component.

5. The method of claim 2, further comprising obtaining the evidence from the host security component, the host security component implemented via firmware and a processor of the host.

6. The method of claim 2, further comprising prior to starting the host:
configuring the host into a state that satisfies the policy;
in conjunction with configuring the host, providing other measurements of the host to the host security component;
obtaining security data from the host security component, the security data indicative of a state of the host, the security data derived from the other measurements; and
providing the security data to the key distribution service for subsequent use in determining when the evidence does in fact satisfy the policy.

7. The method of claim 1, wherein the key distribution service is controlled by a tenant associated with the virtual machine.

8. The method of claim 1, wherein the key distribution service is controlled by one or more entities of a cloud operator that controls the host.

9. The method of claim 1, further comprising obtaining an attestation from the host security component, the host security component comprising a trusted platform module, the attestation based on matching a current state of the host to the state of the host identified in the measurements provided at the pre-defined states during the boot process, the attestation signed by a private key of the trusted platform module.

10. The method of claim 9, further comprising providing the attestation in response to a policy of a tenant associated with the virtual machine.

11. A computer system, comprising:
a system memory for storing data of a host;
one or more processors; and
one or more computer readable storage media having stored thereon computer-executable instructions that are executable by the one or more processors to cause the computer system to securely instantiate a virtual machine, the computer-executable instructions including instructions that are executable to cause the computer system to perform at least the following:
start the host, the host including a virtual environment for hosting a virtual machine, the virtual environment including a virtual security component;
perform a boot process to instantiate the virtual environment;
at pre-defined states during the boot process, provide measurements of the host to a host security component, the measurements identifying a state of the host that satisfies a policy for hosting the virtual machine;
obtain a first cryptographic key from the host security component based on the state of the host, including:
providing the measurements to a key distribution service external to the host;
receiving sealed data that is sealed to a state of the host; and
unsealing the sealed data via the host security component, the host security component configured to unseal the sealed data only when the host security component receives evidence that the host is currently in a state that satisfies the policy for hosting the virtual machine;
use the first cryptographic key to decrypt the virtual security component associated with the virtual machine;
from the decrypted virtual security component, obtain a second cryptographic key associated with a virtual hard drive that is associated with the virtual machine;
use the second cryptographic key to decrypt the virtual hard drive associated with the virtual machine; and
instantiate the virtual machine via the associated decrypted virtual hard drive.

12. The system of claim 11, wherein the first cryptographic key is contained in the sealed data.

13. The system of claim 11, wherein the host security component comprises firmware and at least one of the one or more processors.

14. The system of claim 11, wherein the host security component comprises a discrete trusted platform module device.

15. The system of claim 11, wherein only a hypervisor of the host has write access to the system memory.

16. A computer program product comprising one or more hardware storage devices having stored thereon computer-executable instructions that are executable by one or more processors to securely instantiate a virtual machine, the computer-executable instructions including instructions that are executable to cause the computing device to perform at least the following:
start a host that includes a virtual environment for hosting a virtual machine, the virtual environment including a virtual security component;
perform a boot process to instantiate the virtual environment;
at pre-defined states during the boot process, provide measurements of the host to a host security component, the measurements identifying a state of the host that satisfies a policy for hosting the virtual machine;
obtain a first cryptographic key based on the state of the host, including:
providing the measurements to a key distribution service external to the host;
receiving sealed data that is sealed to a state of the host; and
unsealing the sealed data via the host security component, the host security component configured to unseal the sealed data only when the host security component receives evidence that the host is currently in a state that satisfies the policy for hosting the virtual machine;
use the first cryptographic key to decrypt the virtual security component associated with the virtual machine;
from the decrypted virtual security component, obtain a second cryptographic key associated with a virtual hard drive that is associated with the virtual machine;
use the second cryptographic key to decrypt the virtual hard drive associated with the virtual machine; and
instantiate the virtual machine via the associated decrypted virtual hard drive.

\* \* \* \* \*